INVENTOR

BY

ATTORNEY

Oct. 8, 1963 V. E. MANN ET AL 3,106,613

TELEPHONE CALL FEE REGISTERING ARRANGEMENTS

Filed July 16, 1957 9 Sheets-Sheet 2

Oct. 8, 1963 V. E. MANN ET AL 3,106,613

TELEPHONE CALL FEE REGISTERING ARRANGEMENTS

Filed July 16, 1957 9 Sheets-Sheet 9

United States Patent Office 3,106,613
Patented Oct. 8, 1963

3,106,613

TELEPHONE CALL FEE REGISTERING ARRANGEMENTS

Victor Edmund Mann, Taplow, England, and George Thomas Baker, deceased, late of Taplow, England, by Midland Bank Executor and Trustee Company Limited, administrator, London, England, assignors to British Telecommunications Research Limited, Taplow, England, a British company Filed July 16, 1957, Ser. No. 672,251
2 Claims. (Cl. 179—7)

Figure 1:
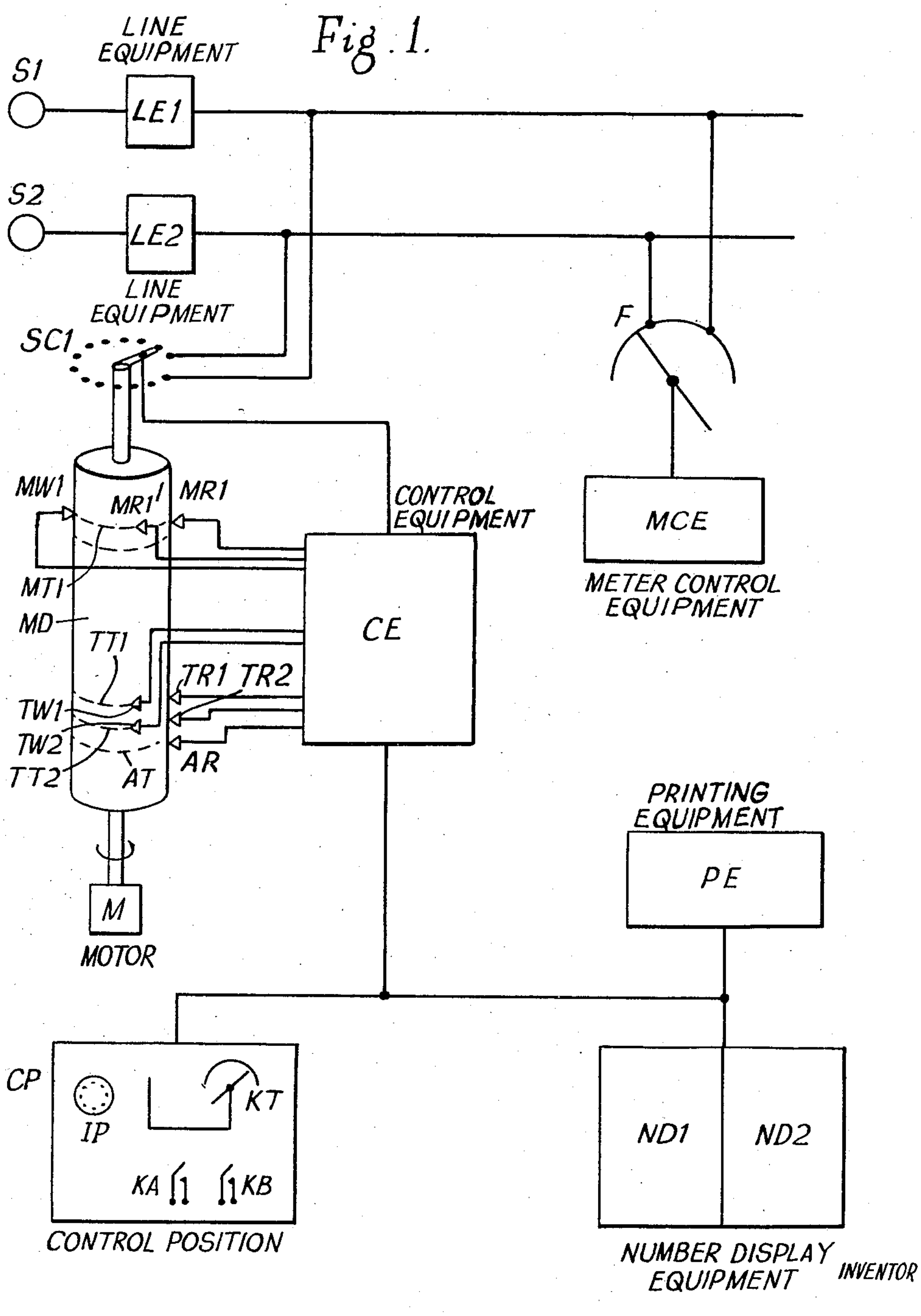

This application is a continuation-in-part of the application of George T. Baker et al., Serial No. 357,473, filed May 26, 1953.

The present invention relates to telephone or like systems and is more particularly concerned with public telephone systems of the type in which the number of calls completed by a subscriber or the number of unit values represented by such calls is recorded on some type of register device, the information from which is then used as the basis for rendering accounts.

The arrangement almost universally adopted at the present time is to make use of an electromagnetically-operated step-by-step counter individually associated with each subscriber's line and operated one or more times in respect of each completed call. Readings of the various counters are made at predetermined intervals, for instance monthly or quarterly, and the accounts to the subscribers are made out from the figures thus obtained. The individual reading of the meters and the preparation of the accounts is a somewhat tedious business, however, even if some degree of mechanisation is used, for instance the employment of punched cards, and in addition the meters occupy a good deal of space. The chief object of the present invention is to improve the arrangements for registering the number of calls made by a subscriber and to reduce the amount of equipment required and in addition to simplify and expedite the subsequent processing of the information registered.

According to one feature of the invention in an arrangement for registering total fees for telephone calls in response to the receipt of meter pulses, a continuously-operated high-speed register device is provided in common to a plurality of subscribers' lines which are arranged to be scanned at regular intervals in synchronism with the operation of the register device and when an indication corresponding to a meter pulse is found a registration is made in the appropriate storage area of the register device.

According to another feature of the invention in an arrangement for registering total fees for telephone calls in response to the receipt of meter pulses, use is made of a magnetic drum storage device common to a plurality of subscribers' lines which are arranged to be scanned at regular intervals in synchronism with the operation of the drum for the presence of meter pulses which are then registered in the appropriate storage areas assigned to the different subscribers, arrangements being provided for extracting the registrations individual to the different subscribers and displaying them on a common indicating device.

In a preferred form of the invention a magnetic drum is employed which is provided with a plurality of circumferential tracks each having associated therewith a so-called writing head for effecting the registration of suitable information and also a so-called reading head by means of which the information may be extracted when required. Conveniently the information is stored in a binary code and arrangements may be made for reading it successively in respect of all subscribers in response to a suitable initiating operation which will be performed at predetermined intervals in accordance with the present practice of the British Post Office. Alternatively it can be arranged that individual registrations can be extracted as desired and means may also be provided for causing the information to be automatically displayed when the full capacity of any particular register is approached.

It will be understood that the expression "magnetic drum" is intended to cover also a disc and an endless tape though the cylindrical form offers such advantages that it would generally be preferred in practice.

The records of such a registering device have a surprising degree of permanence if no specific action is taken to erase them and therefore there would be no danger of loss of existing storage if there should be a power failure or some other temporary breakdown of the equipment.

Figure 2:
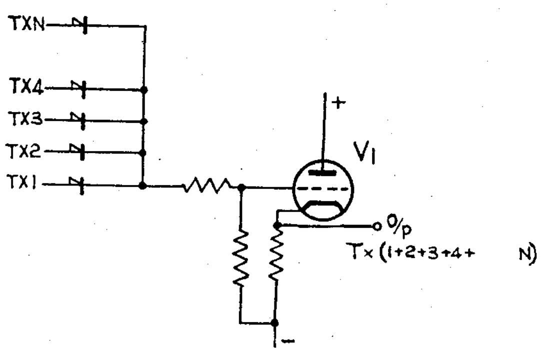
Figure 3:
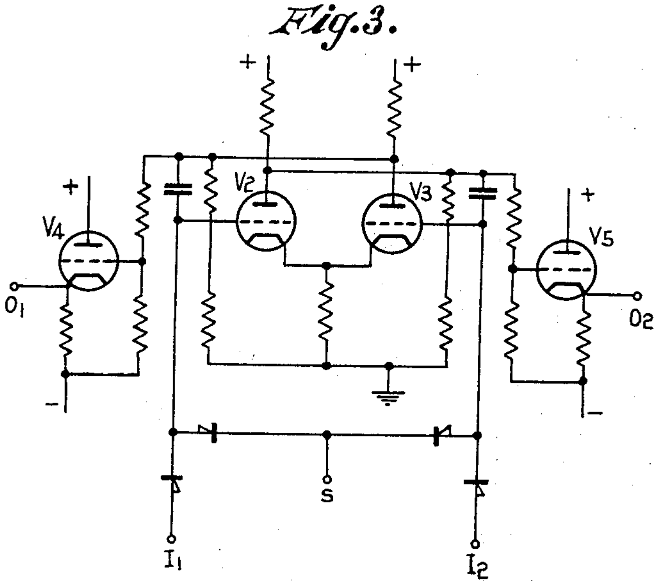
Figure 4:
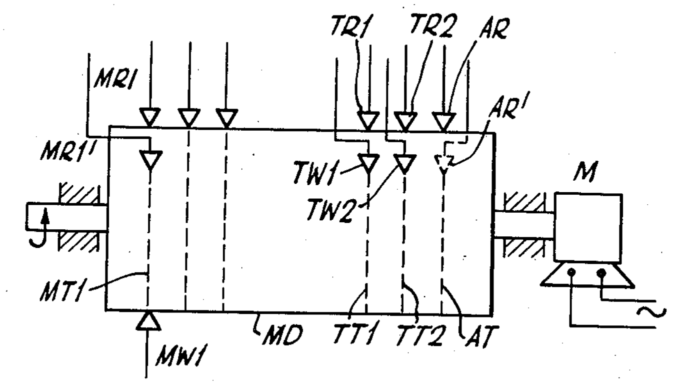
Figure 5:
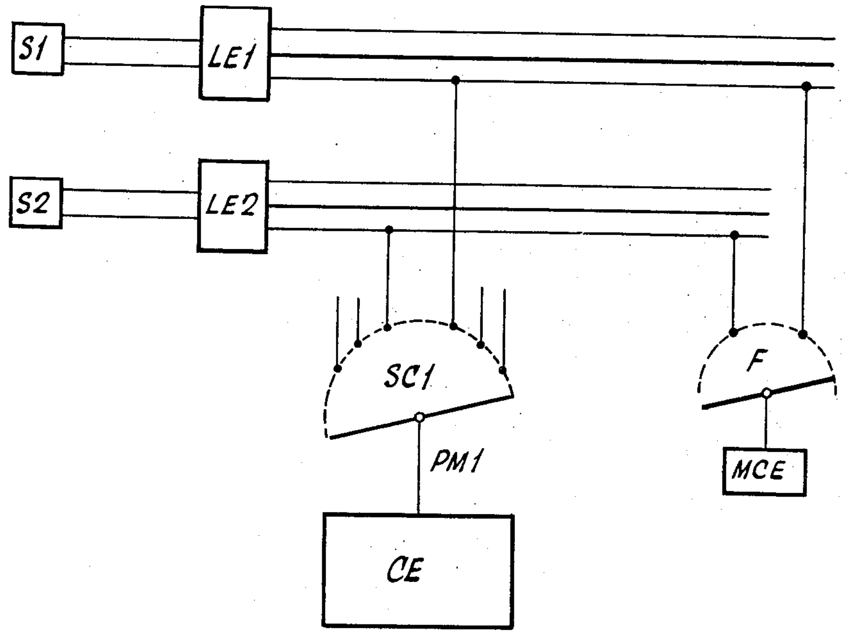
Figure 6:
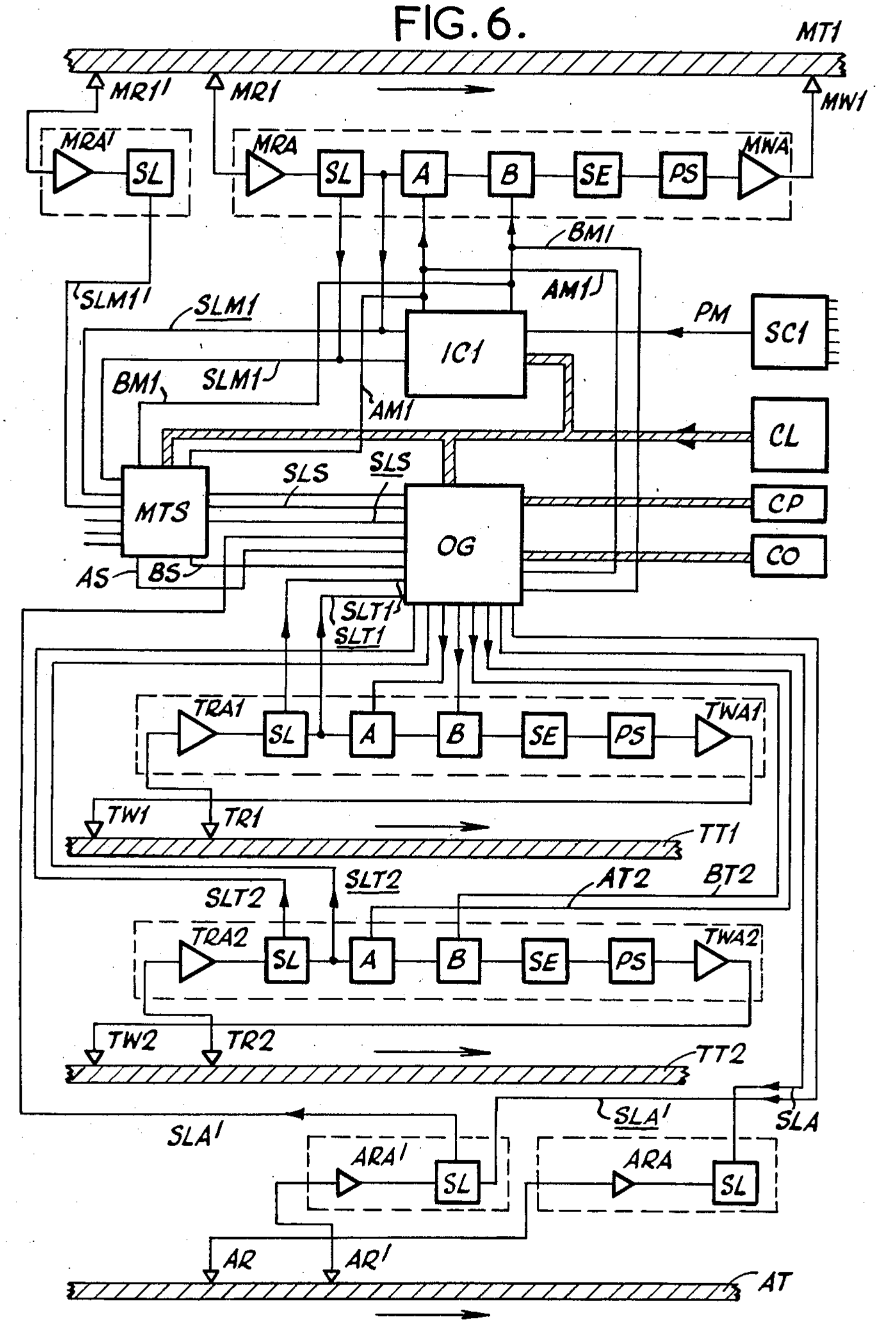
Figure 7:
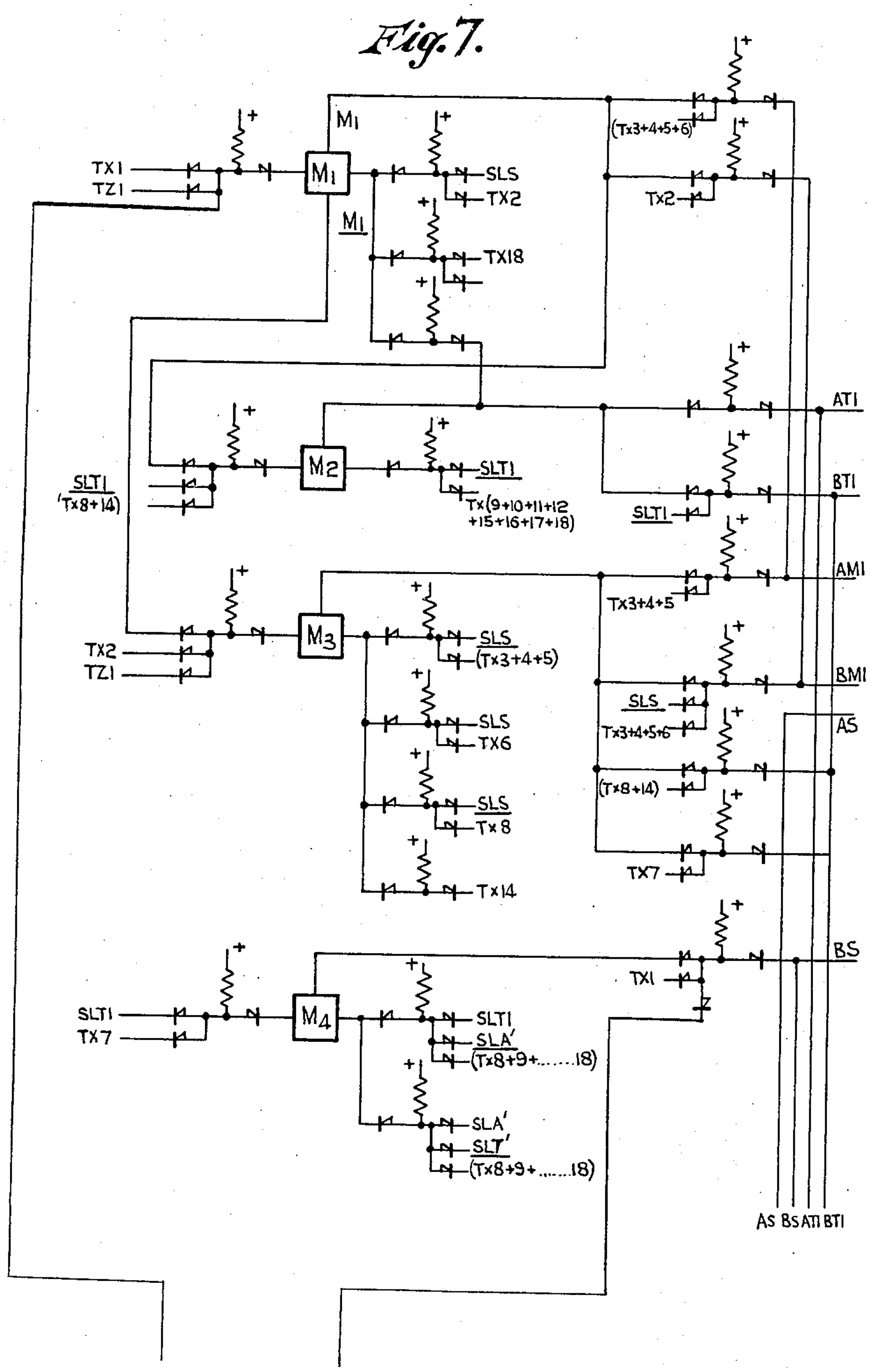
Figures 8, 11:
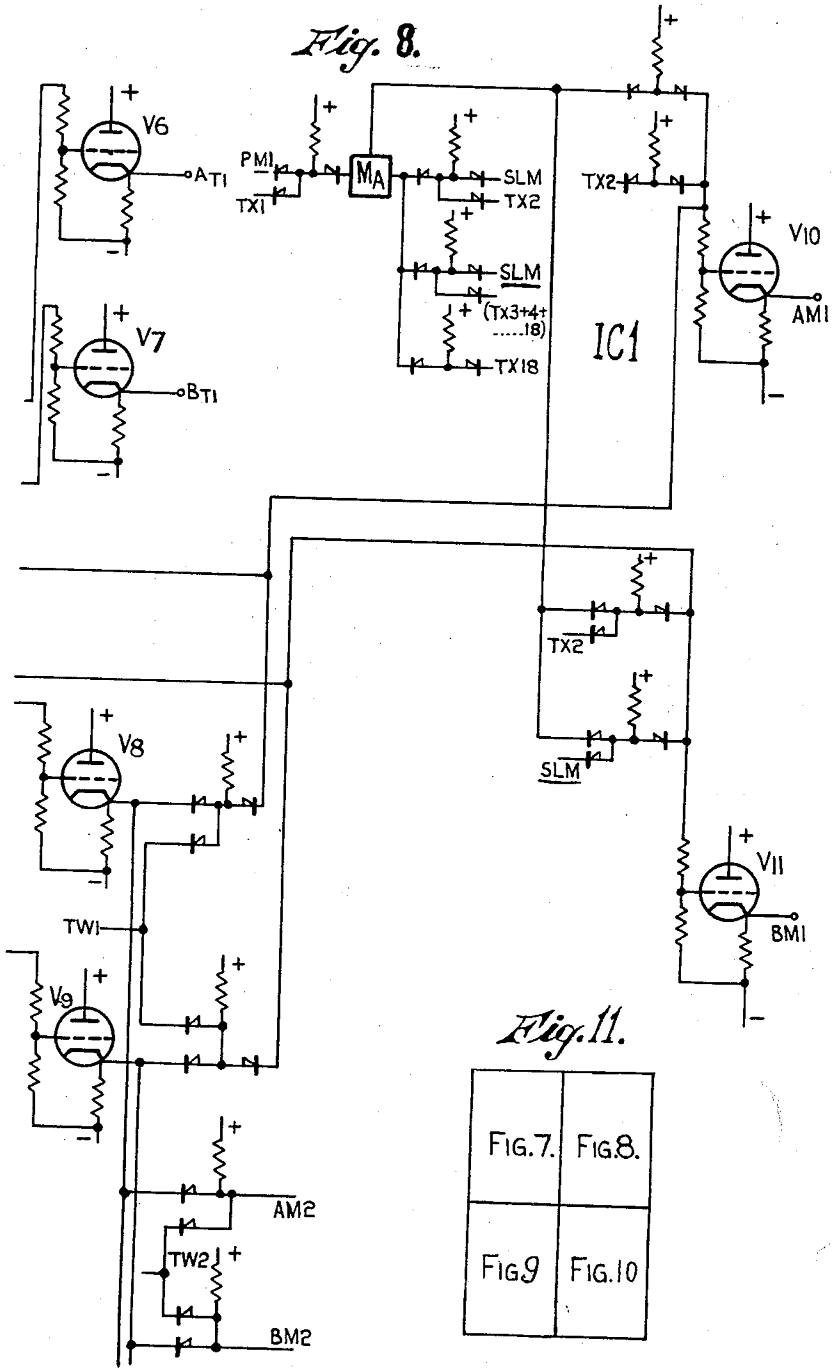
Figure 12:
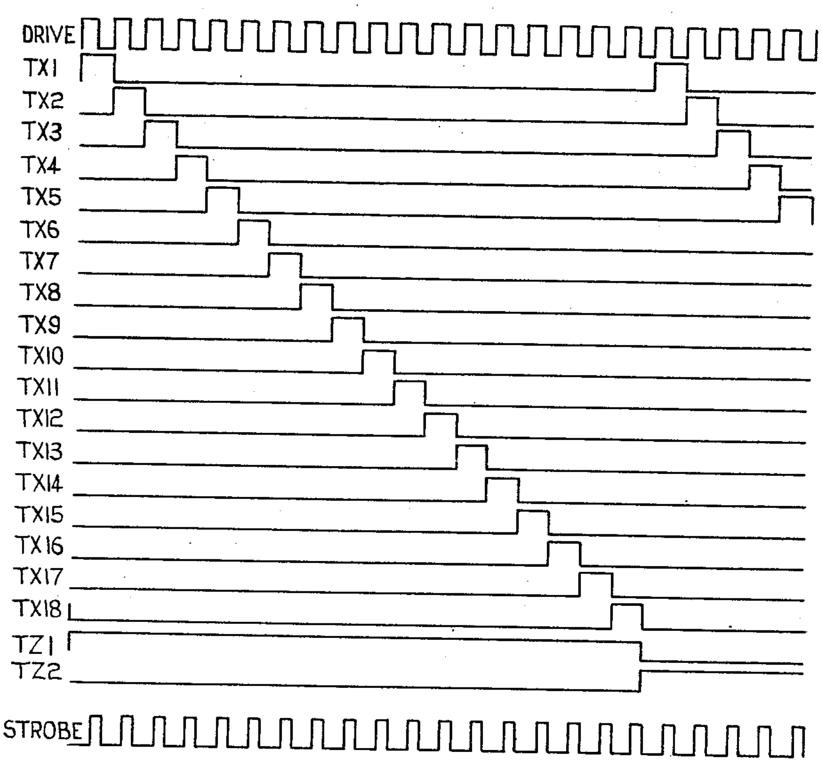

The invention will be better understood from the following description of a preferred form of carrying it into effect which should be taken in conjunction with the accompanying drawings comprising FIGURES 1 to 12. Of these, FIGURE 1 is a block schematic showing the general arrangement of the equipment used in one form of carrying out the invention; FIGURE 2 indicates one method by which pulses from different leads carrying timing waveforms may be combined so that control can be exercised over a single lead in respect of the periods represented by all the pulses concerned without any undesirable back coupling being produced; FIGURE 3 is a circuit diagram of a so-called memory circuit which forms one of the units from which the complete circuit is made up; FIGURE 4 indicates diagrammatically the magnetic drum and the location of the reading and writing heads; FIGURE 5 shows a portion of a telephone system indicating the relationship of the equipment embodying the invention to the known equipment for setting up calls; FIGURE 6 indicates in block schematic form the general layout of the complete installation and shows in greater detail the equipment CE of FIGURE 4 together with the scanner SC1; FIGURES 7–10 when fitted together in the manner indicated in FIGURE 11 show by conventional circuit diagrams the detailed circuit arrangements of the installation, these circuits representing the portions IC1, OG, CP and CO of FIGURE 6; while FIGURE 12 is a chart showing the time relationship of the various pulses or waveforms which are connected to common leads from a so-called clock device to give the necessary control.

The general arrangement of the drum circuits is assumed to be similar to that disclosed in the co-pending application of G. T. Baker, Serial No. 300,429, filed July 23, 1952, from which full details can be appreciated and it will suffice here to refer to it in general terms only except as regards the specific additional circuits according to the invention. The drum is assumed to be a cylinder having a carefully prepared magnetic surface, for instance of electro-deposited nickel, and is continuously rotated about its axis at a substantially constant speed. Though the surface is in fact uniform, the provision of suitable reading and writing heads in effect splits it up into a number of circumferential tracks. Owing to considerations of space, the reading and writing heads relating to any individual track must be displaced physically but they can readily be controlled by suitable timing pulses to become operative at the appropriate instants. As explained in the above-mentioned specification, it is convenient to make use of a certain measure of regeneration and control is by means of so-called A and B leads. On the connection of suitable potential to the A lead at any instant, the portion of track which is then co-operating with the writing head has its registration changed to or maintained as a "0," while on the connection of potential to the B lead, a "1" is written in or maintained. If potential is connected to both A and B leads simultaneously, the effect of the B lead predominates and registration of a "1" results.

In the arrangement indicated in FIGURE 4 and dealt with in detail in FIGURES 6–10, the drum is provided with at least four tracks, first a so-called address track provided with permanent information in the form of the numbers 1 to 100 corresponding to 100 subscribers which is assumed to be the capacity of a single track, secondly a first transfer track on which a number dialled in is stored and subsequently compared with the address track, thirdly a second transfer track to which a meter registration is transferred while it is being extracted, and fourthly at least one meter track on which registrations corresponding to the number of calls or units recorded for the various lines are registered. Conveniently each track caters for 100 subscribers as suggested above so that a number of tracks and in a large exchange possibly a number of separate drums will be required. Each storage area or register corresponding to an individual line comprises 18 separate elements, the first two of which are used for control purposes while the others serve to store the meter registrations in a binary code. On this basis it is possible to record over 60,000 registrations which is probably amply sufficient for practical purposes. In one of the meter tracks which may be considered as the first meter track one position corresponding to a subscriber's meter registration is set aside for control purposes.

The drum is operating continuously and in conjunction therewith is a scanning device for each meter track which continuously tests the group of 100 subscribers' meter wires corresponding thereto for the presence of metering pulses. It is important that the rate of scan should be sufficient to detect any change in the condition of the meter wire and with the type of meter pulses at present used, this requirement is met if scanning takes place every 33⅓ ms. As however the length of meter pulse may not be accurately controlled, it is arranged that registration takes place when a change is detected from absence to presence of a meter pulse and no further registration is made however long the pulse persists or when it finally disappears, i.e. a change from presence to absence.

The so-called clock pulses, which may be derived from the drum itself or from a separate source, control the various operations and also serve to synchronise the scanning operation of the meter wires. As shown in FIGURE 12, the top line represents a drive waveform from which the various pulses are produced and this indicates pulses with equal on and off periods and a repetition time equal to the time corresponding to the sweeping of one element on the drum. The lines TX1 to TX18 show how pulses are produced in succession corresponding to the 18 units forming a complete register after which they again repeat. The TZ pulses, of which only two are shown, correspond to individual registers. The TW pulses, which are not shown, correspond to the different meter tracks which are dealt with in turn making use of common equipment whereby appreciable economy is secured. This is possible because it is only required to read off any one meter at a time. With the assumptions made each TW pulse will be equal in length to 100 TZ pulses and if there are six meter tracks, there will be 6 TW pulses TW1–TW6, TW1 following immediately after TW6. In addition so-called strobe pulses shown in the bottom line of FIGURE 12 are used and these are similar to the drive waveform pulses but are even narrower than the drawing suggests and occur at the end of the TX pulses. These strobe pulses are employed in connection with the memory circuits about to be described in connection with FIGURE 3.

Referring now to FIGURE 1, this shows a block schematic of the general layout of the equipment. The subscribers' lines S1 and S2 extend respectively to line equipments LE1 and LE2 in the exchange and connections extend from the right of the drawing to further equipment (not shown). The magnetic drum MD is driven by a motor M at substantially constant speed and is provided with a number of meter tracks of which that indicated at MT1 is typical. This is provided with a writing head MW1 and a reading head MR1 and also an auxiliary reading head MR1' which is located one register in advance of the main head MR1 so as to obtain access to any particular record before it reaches the main head. In addition there are two transfer tracks TT1 and TT2 and co-operating with them are two writing heads TW1 and TW2 and corresponding reading heads TR1 and TR2. These are located apart a distance equal to the length of one register and are connected by a regenerative loop so that information picked up by the reading head is then written by the writing head and thus appears repeatedly round the circumference of the drum. In addition there is an address track with an associated reading head AR. The various amplifiers, pulse shapers and samplers which are necessary for obtaining the desired results are assumed to be included in the rectangle labelled CE which thus represents the appropriate control equipment.

Operating synchronously with the movement of the drum and shown diagrammatically as connected on the same shaft is a scanner SC1 in which an arm moves over a series of contacts whereby the different subscribers' lines are associated in turn with the control equipment.

The subscribers' lines can also be associated over the finder switch F with the meter control equipment MCE whereby pulses are applied to the meter leads of the different subscribers' lines in accordance with the calls which have been set up. The presence of a pulse on a particular subscriber's meter lead is detected by the scanner SC1 and is thus transmitted to the control equipment CE where it serves to produce changes in the recordings on the drum.

The equipment also includes a control position CP provided with an impulse sender IP in the form of a dial switch and also a manually operable switch KT for track selection. In addition the operator at the control positions is provided with keys KA and KB the purpose of which will be appreciated as the description proceeds. Also associated with the control equipment CE is printing equipment PE and number display equipment divided into two separate sets ND1 and ND2. The printing equipment may be operated to print out the reading of a subscriber's meter as recorded on the drum in association with his directory number. The display equipment ND2 may be arranged to display a subscriber's number and the equipment ND1 may display the total of his meter registrations. All this equipment is further described in connection with FIGURES 4, 5 and 6 and detailed circuits for effecting its operation are given in FIGURES 7–10.

Referring now to FIG. 2, this shows a convenient arrangement for producing what is in effect a combination pulse lead on which pulses are obtained at non-uniform intervals. It will be appreciated that the mere connecting together of the various leads concerned would not be satisfactory as this would produce pulses on all these leads at a time when there were pulses on any of them. In the arrangement of FIGURE 2, the pulse leads concerned are connected by way of individual blocking rectifiers to the grid of a thermionic valve $V_1$ connected as a cathode follower. The output is taken from the cathode and it will be seen that pulses will then appear on this output lead at times corresponding to any of the separate pulse leads but there will be no undesired back coupling of the different pulse leads. Such special pulses are connected to the correspondingly marked leads in FIGURES 7–10.

Considering now FIGURE 3, this shows details of a suitable form of so-called memory circuit which is conveniently employed as a switching element at a number of points in the control equipment shown in FIGURES 7–10. The memory circuit is a toggle circuit having two stable positions one of which may be regarded as the normal position. It can be changed from this normal position to the other or operated position as a result of suitable potential applied to the operating terminal $I_1$ and back again to the normal position by the application of potential to the reset terminal $I_2$. It comprises two triodes $V_2$ and $V_3$, with their grids and anodes cross-connected in known manner, feeding two further triodes $V_4$ and $V_5$ which are arranged as cathode followers so as to give a low impedance output. The normal output, that is to say positive potential when the toggle is changed over to its operated position, is obtained from terminal $O_1$, while terminal $O_2$ serves to provide an inverse output which is required in certain circumstances. In addition the operation of the toggle is controlled by strobe pulses applied to terminal S which may be described as a strobe terminal. For proper operation of the circuits it is desirable that the changeover of the toggle when required does not take place until substantially the end of the particular TX clock pulse concerned in order that the effect of the changeover shall not become operative in that particular position. With the arrangement shown, neither the operating pulse applied to terminal $I_1$ nor the reset pulse applied to terminal $I_2$ can become effective until the appropriate strobe pulse has been applied to terminal S and by this arrangement the reliability of the circuit is assured. This point will be more fully appreciated from consideration of the bottom line in FIGURE 1 in relation to the various TX pulses.

Referring now to FIGURE 4, the magnetic drum MD is conventionally indicated as supported in suitable bearings with its axis horizontal and arranged to be driven by an electric motor M fed from a suitable source. This drum is provided with the meter track MT1 and as many similar tracks as may be required depending upon the size of the installation. The track MT1 is provided with a writing head MW1 and a reading head MR1 which are conveniently located 180° apart though this arrangement is not essential. In these circumstances in view of the regenerative loop provided as explained in the application previously mentioned, the record is repeated in the two halves of the track. Alternatively, the heads may be displaced by some other angle but unless this is an exact sub-multiple of 360°, any item of information will continually change its position on the drum.

The track MT1 has also associated with it an auxiliary reading head MR1′ which is located a distance equal to the length of one meter register ahead of the reading head MR1. Consequently the information recorded in the track MT1 may be sampled by the auxiliary reading head MR1′ while the regular reading head MR1 is still in association with the previous meter register.

As mentioned above, the drum is also provided with two transfer tracks TT1 and TT2 provided with reading heads TR1 and TR2 and writing heads TW1 and TW2 respectively. The reading and writing heads of a transfer track are located a distance apart equal to the length of a single meter register and are connected to form a regenerative loop so that when information is supplied to the writing head it is repeated round the circumference of the drum.

AT represents the address track which contains permanent information so that in normal operation a writing head is not required and has not been shown. Obviously such a writing head will be necessary to record the permanent information initially and to change it subsequently if this should be necessary. The address track is however provided with an auxiliary reading head AR′ but unlike the auxiliary reading head MR1′ this is located one register length behind the regular reading head AR so that it is always in association with the meter register which has just been dealt with by the regular reading head. The purpose of this arrangement, which is adopted to simplify the circuits, will appear as the description proceeds.

Considering now FIGURE 5, this shows by way of example two subscribers' stations S1 and S2 associated respectively with line equipments LE1 and LE2. From these equipments three leads are assumed to extend to the switch train over which connections are set up and one of these leads is assumed to be the meter lead connected to a meter forming part of the line equipment. It is assumed moreover that in response to the setting up of a call from either of these stations, meter control equipment MCE is associated with the line in question over the finder switch F and this equipment in known manner subsequently transmits impulses for effecting meter operation in accordance with the value of the call which has been set up. Accordingly in respect of each pulse for effecting meter operation a characteristic potential will be applied to the meter lead.

FIGURE 5 also shows the scanning device SC1, indicated as a block in FIGURE 6, which is shown diagrammatically as a mechanical switch which is rotating continuously and is assumed to connect in turn with the meter leads associated with the 100 different subscribers. In practice the scanner will preferably be of the electronic type since in view of the speed at which it is required to operate, there would be serious problems in providing a mechanical switch which was not subject to undue wear. As pointed out above, the speed of the scanner must be such that it tests each line at intervals less than the duration of a meter pulse otherwise there would be danger of a pulse not being detected and thus not registered on the magnetic drum. A separate scanner will be provided for each meter track, which is assumed to cater for 100 subscribers. Obviously each scanner must be synchronised with the speed of rotation of the drum so that it makes connection with the meter lead of any particular line while the meter register associated with that line is co-operating with the reading and writing heads.

Considering now FIGURE 6, this indicates the general layout of the equipment in greater detail though still in block schematic form, portions of the tracks on the drum being indicated by the shaded areas which are assumed to move in the direction indicated by the arrows. The topmost shaded area MT1 represents the first one of the meter tracks and as explained in connection with FIGURE 4, as many more will be provided as necessary to cater for the number of subscribers concerned. In addition, FIGURE 6 indicates similarly portions of the first transfer track TT1 and the second transfer track TT2 and also the address track AT. Each track is assumed to have a control panel which is indicated by the dotted rectangle enclosing the equipment which would be mounted thereon. In addition SC1 again represents one unit of the scanning equipment which scans 100 subscribers' meter wires in turn and connects potential to lead PM1, if a metering impulse is being applied to the wire then being scanned. The equipment SC1 is associated with the incoming control equipment IC1 which is individual to the meter track MT1. Similar equipments are provided for the other meter tracks. CL represents the clock which supplies the pulses TX1 . . . TX18, TZ1 . . . and TW1 . . . which have the time relation as described in connection with FIGURE 2 and are connected to the leads similarly marked in FIGURES 7–10. It will be understood that the pulses concerned may be derived from a separate track on the drum from an external source of controlled frequency which can also be employed to ensure the synchronous operation of the drum. CP represents the control position incorporating a dial switch and the necessary control keys KA and KB and switch KT whereby an operator can control the reading off of the meter registrations either in respect of one particular subscriber or of all the subscribers in turn. CO represents printing equipment and a counter which responds to the impulses transmitted from the outgoing control equipment OG and indicates the value of the appropriate registrations.

Associated with the first meter track are the reading head MR1 and the writing head MW1 and in addition the auxiliary reading head MR1' is provided to facilitate operation in the manner mentioned above and more fully described in the co-pending application of G. T. Baker, Serial No. 357,472, filed May 26, 1953. The reading head MR1 is connected to the amplifier MRA the output of which extends to equipment which is similar for each of the panels except those associated with the address track, namely units marked SL, A, B, SE and PS respectively. The SL conversion equipment provides two complementary outputs in the shape of squared pulses, the normal output which is applied to leads marked SL with a suffix comprising impulses corresponding to 1's registered on the meter track and the inverse output which is applied to leads marked $\underline{SL}$ with a suffix comprising pulses representing 0's registered on the meter track. The A and B equipments supply potential respectively to the A and B leads referred to earlier as serving for altering the registration, the A equipment controlling erasure, that is alteration of "1" to "0" and the B equipment controlling the writing-in of dots, that is alteration of "0" to "1." If both equipments become operative simultaneously, the B equipment predominates and writing-in of a "1" takes place.

The equipment SE deals with the output which is obtained from the A and B equipments and this is passed to the equipment PS, the so-called pulse sampler, and then in the case of the first meter track to the amplifier MWA for the writing head MW1. All this equipment is explained in detail in the co-pending application No. 300,429 previously referred to where it is also pointed out that regeneration normally takes place so that the equipment shown provides a complete loop. Alteration can be effected however by suitable input to the A and B equipments and samples of the existing registrations can be extracted over the appropriate SL and $\underline{SL}$ leads.

As already mentioned the speed of rotation is governed by the requirement that the scanning of the subscribers' meter leads must take place at intervals appreciably less than the duration of a meter pulse, otherwise there would be danger of a pulse being lost in adverse circumstances. There is no particular limitation however on the speed at which the information is to be withdrawn from the register and economy can be secured by using some of the equipment in common to all the meter tracks. The meter track switching equipment is indicated by MTS and this is described in greater detail in the co-pending application of G. T. Baker et al., Serial No. 357,528, filed May 26, 1953. It will be seen that the output from the single meter track shown is applied to lead SLM1 and the inverse output to lead $\underline{SLM1}$ while the output from the track switching equipment which is derived from the individual meter tracks in turn appears on SLS and the inverse output on lead $\underline{SLS}$.

Each of the transfer track panels includes similar equipment to form a regenerative loop and the association with the drum in the case of transfer track 1 is effected by the reading head TR1 and the writing head TW1. In this case there is no need for an auxiliary reading head. Transfer track 2 also has a similar panel of equipment and the reading and writing heads are designated respectively TR2 and TW2. The address track AT differs from the others in that it contains permanent information and does not make use of regeneration and in normal use only employs reading heads, a main reading head AR and an auxiliary reading head AR'. The reading head AR feeds through an amplifier ARA to the SL equipment from which a normal output is obtained on lead SLA. The auxiliary reading head AR' feeds through a similar amplifier ARA' to SL equipment from which a normal output is obtained on lead SLA' and an inverse output on lead $\underline{SLA}$'.

Consideration will now be given to the detailed circuits which are shown in FIGS. 7–10 which should be arranged as shown in FIGURE 11 to form a complete circuit. This represents the equipment OG and IC1 shown in FIGURE 6 together with the equipment at the control position CP and a showing in block schematic form of the printing equipment and counter CO. In order to avoid complicating the drawing unduly, the circuits of FIGURES 7–10 have suitable indications on the various time pulse leads as already explained and also have indications on other leads which indicate the potentials connected thereto. These leads are shown in FIGURE 6 connecting to the various other items of equipment, particularly the track control panels. It should also be mentioned that the so-called memory circuits such as M1–M10 which are shown as rectangles are similar to that shown in detail in FIG. 3. The input for operation of these memory circuits is assumed to be applied from the left and that for reset from the right. The normal output is considered to be obtained from the top and the inverse output from the bottom of the rectangle. It should be mentioned further that in order to obtain a low impedance output, the various A and B leads make use of cathode follower valves for connecting the necessary potentials to the A and B equipments but in order to facilitate the understanding of the drawing the same references are applied to the control leads before and after the cathode follower valves.

Considering first the normal registration of meter pulses connected to the various subscribers' meter wires, it will be appreciated that this involves only the meter tracks and as already pointed out these consist solely of areas assigned to the different subscribers except that the first subscriber's position on the first meter track is used for control purposes. The method of use of the various tracks will be better understood from the following table:

| | First meter position 1st track | Remaining meter positions 1st track and all other meter tracks | Address tracks | First transfer track |
|---|---|---|---|---|
| TX1 | Spare | Reading-off control | Spare | Spare. |
| TX2 | Dialling-in control | Metering-in control | do | Do. |
| TX3 | Timing count for detecting interdigital pause. | $2^0$ | do | Do. |
| TX4 | | $2^1$ | do | Do. |
| TX5 | | $2^2$ | do | Do. |
| TX6 | Busy guard | $2^3$ | do | Do. |
| TX7 | Spare | $2^4$ | do | Search for address control. |
| TX8 | do | | Busy control "A" digit | |
| TX9 | do | | "A" digit | |
| TX10 | do | Register number stored in binary form. | | |
| TX11 | do | | | |
| TX12 | do | | Spare | |
| TX13 | do | | Busy control "B" digit | |
| TX14 | do | | | |
| TX15 | do | | "B" digit | |
| TX16 | do | $2^{13}$ | | |
| TX17 | do | $2^{14}$ | | |
| TX18 | do | $2^{15}$ | | |

As long as there are no pulses on any of the meter wires, the scanning operation produces no circuit changes and the incoming equipment IC1 indicated in FIGURE 6 which is shown on the right of FIGURE 8 is not operated. If however a pulse is detected on the common output meter wire PM1 during the time corresponding to the first unit position for any meter in the hundreds group corresponding to the first meter track, the memory circuit MA is operated over the coincidence circuit PM1, TX1 and records this information by writing a 1 in the second position of the relevant portion of the first meter track. This is done by way of the coincidence circuit involving lead TX2 and the normal output from memory circuit MA. As already mentioned the normal output from any memory circuit is shown extending from the top of the rectangle while the inverse output is shown extending from the bottom. Potential is then applied to the grid of valve $V_{11}$ the cathode of which is connected to lead BM1, the B lead for the first meter track. There is also a connection to the A lead AM1 in this position but as already pointed out the B lead is effective under these conditions.

Assuming that for this particular subscriber this represents a change in that no metering pulse was present on the preceding scan, there is no previous registration in this second position so that the first reset circuit for the memory circuit MA does not become operative and MA remains in the operated condition. Accordingly it is effective to add 1 to the number already stored in the register in positions 3 to 18. This addition of 1 is effected in known manner by changing all the existing registrations until a 0 has been changed to a 1. This effect is produced since the operated condition of the memory circuit MA serves to apply potential to the grid of the valve $V_{10}$ and hence to the lead AM1 connected to its cathode so that if the existing registration is a 1 it is changed to a 0. When a 0 is encountered, however, the coincidence circuit constituted by the output of the memory circuit MA and the pulse lead $\overline{SLM1}$ serves to connect potential to lead BM1 which overrides the effect of potential on the lead AM1 and changes the 0 to a 1. When this particular change occurs, however, the coincidence circuit $\overline{SLM1}$, TX(3+4 . . . 18) resets the memory circuit so that no further changes are made. The third reset circuit for the memory circuit MA is provided to ensure that the memory circuit is reset for the following register if the full capacity of any register should be reached.

If there is still potential on the meter lead in question during the succeeding scan, the memory circuit MA will again be operated, but in consequence of the 1 registered in the second position will be immediately reset by the first reset circuit SLM1, TX2. This occurs also on succeeding scans as long as the same conditions apply. When the meter pulse disappears, the memory circuit will not be operated and hence potential will not be connected to the grid of valve $V_{11}$ and the registration in the second position will be erased by the connection of potential to the grid of valve $V_{10}$ and hence to lead AM1.

It will be appreciated that a memory circuit such as MA is provided for each track but that the memory circuits for controlling display which will now be described are common to all the tracks.

Figure 9:
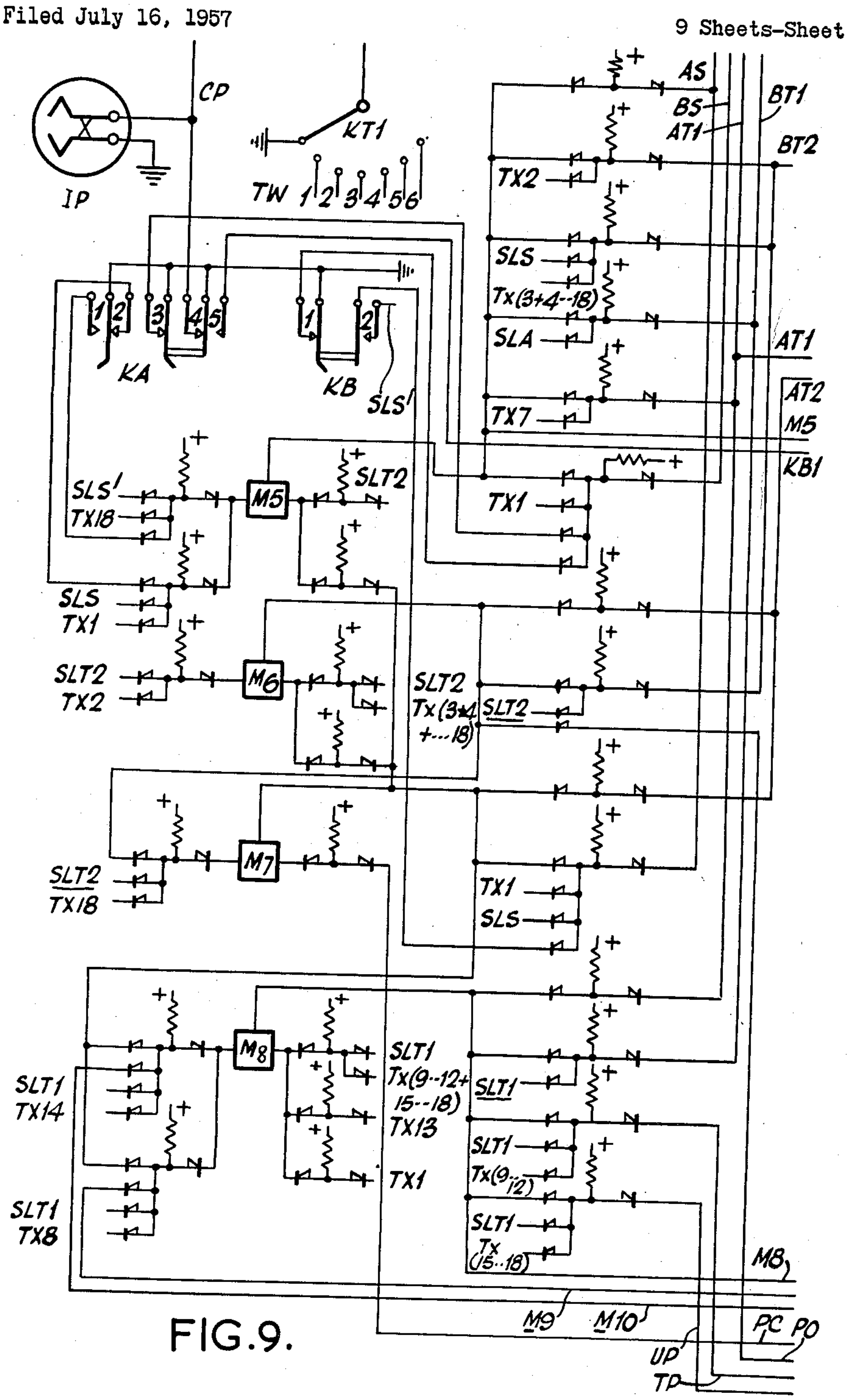
Figure 10:
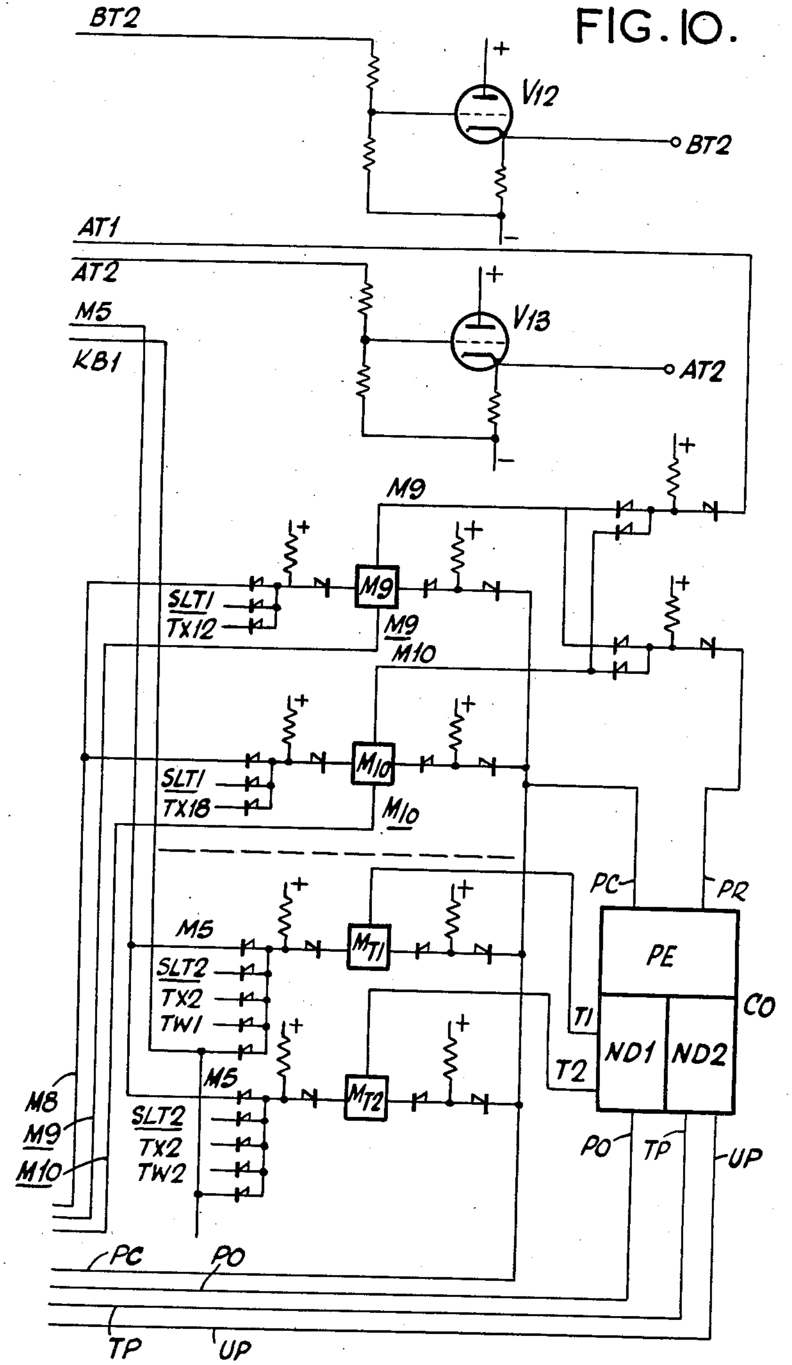

The circuits show nin FIGURES 7, 9 and 10 provide that in response to the dialling in of any subscriber's number from the control position CP, the associated meter reading shall be transmitted and set up on a high-speed counter by which it can be suitably displayed or alternatively it may operate a printer. In addition the subscriber's number is also transmitted similarly. If a further control key is operated, the equipment will continue to extract registrations in respect of all the subscribers in turn. Consequently in response to an initial dialling operation to select the subscriber whose register is to be dealt with first, the whole of the stored information can be extracted by the use of the circuits shown. The registrations are then erased ready for a further count but if required it could readily be arranged that the stored information was sampled and left intact if it should be desired merely to ascertain the state of any particular subscriber's register at a given time.

The circuit shown also provides arrangements whereby if the registration is approaching the full capacity of the storage, the information is automatically transmitted and the registration reset to zero and this might be found to be a more desirable method of operation dependent upon the views of the telephone administration.

The general operations which are performed in response to the dialling of a particular number are that the digits diailled are set up on the first transfer track and this registration is then compared with the various addresses in the address track to locate the meter registration associated with that subscriber which will be in the position corresponding to his address. This registration is then transferred to the second transfer track and erased from the meter track. From the second transfer track it is transmitted to the counter and at the same time the address from the first transfer track is transmitted to suitable counting on display equipment so as to associated the subscriber's number with his meter registration. If the automatic step-on facility is being employed, the meter registration in respect of the next subscriber is then similarly dealt with, his number being also transmitted but in this case the read off process is initiated by use of the previously marked control dot of the meter track concerned. The subscriber's number is obtained by reference to the address track.

Considering now the detail circuit as shown in FIGURES 7–10, the switch KT1 at the control position CP, FIGURE 9, is first operated to select the appropriate meter track and then key KA is operated to reverse contacts KA1 to KA5. No effect is produced until the dial is operated and on the first break of the impulse springs IP, the memory circuit M1 is operated in position 1 of the control portion of the first meter track in the coincidence circuit TX1.TZ1 and thereupon it writes in a 1 in position 2 by connecting potential to lead BM1 extending to valve $V_{11}$ and clears the count in positions 3 to 6 by connecting potential to lead AM1 extending to valve $V_{10}$. At the same time it operates the memory circuit M2 in position 8 or position 14 depending on which of these positions in the first transfer track is first encountered without a busy dot, i.e. depending on whether or not one digit is already registered thereon. Memory circuit M2 thereupon resets memory circuit M1 and adds one to the number stored on the first transfer track corresponding to either the A or B digit. On the assumption that this is the first dialling operation, both the A digit registration area positions 9 to 12 and the B registration area positions 15 to 18 will be clear, consequently memory circuit M2 will have been operated in position 8 and the storage area will be clear.

The process of increasing the stored binary registration by 1 is effected as already described by reversing all the elements of the existing registration until a 0 has been changed to a 1. Reversal of existing 1's is effected by potential on the lead AT1 extending to valve $V_6$, while insertion of 1's is effected by the coincidence circuit involving lead $\overline{SLT1}$ by which potential is connected to the lead BT1 extending to valve $V_7$. Since the existing registration is 0 in all the areas concerned, the necessary change has been made when a 1 has been written in position 9 and memory circuit M2 is then reset. Memory circuit M1 may be again operated on the next scan if the dial contacts IP are still open, but it is at once reset in the coincidence circuit SLS, TX2 by the marking in the TX2 position and hence memory circuit M2 is not operated and no further addition is made to the record on the first transfer track.

When contacts IP are subsequently closed, memory circuit M1 is unable to operate and memory circuit M3 operates in position 2 of the control portion of the first meter track dependent on time pulse TZ1 and thereupon adds 1 to the timing count in positions 3–5 of the control portion of the first meter track and is thereupon reset. This is effected by the circuit M3, TX(3+4+5) connecting potential to lead AM1, circuit M3, SLS, TX(3+4+5) connecting potential to lead BM1 and circuit SLS, TX(3+4+5) resetting memory circuit M3. This operation is repeated on each subsequent scan. When the dial contacts again open, assuming this takes place during the same digit and hence before positions 3–5 are filled with 1's memory circuit M1 is re-operated and the timing count is cleared by potential on AM1 in the circuit M1, TX(3+4+5+6) and a further 1 is added to the registration on the first transfer track. This process is repeated for any further impulses in the train.

When positions 3, 4 and 5 in the control portion of the first meter track all register 1's, i.e. a count of 7 has taken place without any change in the position of the dial contacts, this indicates the end of a digit. The memory circuit M3 then remains operated until position 6 and by the normal addition process inserts a dot in this position in the control portion of the first meter track which dot acts as a busy guard. It also inserts a dot in position 7 on the first transfer track by connecting potential to lead BT1 in the circuit M3, TX7 and subsequently a dot in position 8 by means of the circuit M3, TX(8+14) and this latter dot serves as a busy control for the A digit. Memory circuit M3 is then reset over SLS, TX8. Operation of the dial for the second digit repeats the process, but as the areas 9–12 will be filled and the relevant busy control dot 8 marked, memory circuit M1 will pass over the block associated with the first digit and memory circuit M2 will not be operated until position 14 is reached. Memory circuit M2 will then proceed to add a one to the second digit. Likewise on completion of the operation, memory circuit M3 operates to busy the second digit by marking a busy control dot on area 14.

The marking just noted in position 7 on the first transfer track serves to initiate the comparison with the address track by operating memory circuit M4. It will be recalled that each of the transfer tracks only involves in effect one set of storage units but the information contained therein is repeated over the whole track owing to the provision for regeneration and the fact that the reading and writing heads TR1 and TW1 are spaced one register length apart. As long as there is any difference between the number dialled on to the first transfer track and the various numbers stored on the different sections of the address track, the memory circuit M4 is continually reset by one or other of the coincidence circuits SLT1, SLA', TX(8+9 . . . 18) and SLT1, SLA' TX(8+9 . . . 18). When however coincidence is reached, it remains operated during the succeeding first period and by connecting potential to lead BS inserts a dot in position 1 of the required registration on the appropriate meter track as a reading off control.

At this point it may be pointed out that the meter track A and B leads AS and BS, which are common to all the tracks, extend to the valves $V_8$ and $V_9$ respectively. Connections from the cathodes of these valves extend to coincidence circuits by means of which distribution is effected under the control of the TW pulses to the equipment associated with the different meter tracks, for instance to the valves $V_{10}$ and $V_{11}$ individual to the first meter track. The A and B leads which are concerned solely with the control portion of the first meter track extend however direct to valves $V_{10}$ and $V_{11}$. Outputs on these leads are restricted to the control portion of the first meter track by the clock pulse TZ1 which controls the operation of memory circuits M1 and M3.

On the assumption made that the key KA is operated, contacts KA2 now permit this inserted dot to bring about the operation of memory circuit M5 in the circuit SLS, TX1. Memory circuit M5 is however at once reset by the output on SLT2 if the second transfer track is not clear. Assuming that the second transfer track is clear, memory circuit M5 remains operated and erases the number stored in the register on the meter track by connecting potential to lead AS, inserts a dot in position 2 on the second transfer track by connecting potential to lead BT2 in a circuit including also TX2, transfers the stored number to the second transfer track by connecting potential to lead BT2 over the coincidence circuit M5, SLS, TX(3+4 . . . 18), and erases the dot in position 7 of the first transfer track by connecting potential to lead AT1 in this position, thereby terminating the search for the address by preventing further operation of memory circuit M4. The control of writing on the second transfer track it will be seen is by way of valves $V_{12}$ and $V_{13}$ associated with leads AT2 and BT2. On the succeeding scan of the transfer tracks, that is in the next register position the memory circuit M5 is reset in position 2 owing to the dot which has been inserted in this position on the second transfer track. At the same time and on a number of succeeding scans of the transfer tracks the memory circuit M6 will be operated from this dot in the coincidence circuit SLT2, TX2. Thereupon it is effective to subtract one unit from the existing registration in the second transfer track. This is done in much the same manner as adding one unit, namely by reversing the existing registrations, but in the case of subtraction the process is continued until a 1 has been changed to a 0. The circuit for changing 1 to 0 is the connection of potential to lead AT2 while 0 is changed to 1 by connecting potential to lead BT2 in the coincidence circuit M6, SLT2. Memory circuit M6 is reset when a stored 1 is encountered over the coincidence circuit SLT2, TX(3+4 . . . 18). It will be appreciated that the registration on the second transfer track corresponds to that transferred from the meter track and hence is the information required. On each occasion that memory circuit M6 is operated, a pulse is sent over the lead PO extending to a high speed counter or display device ND1 in the equipment CO, FIGURE 10, which is therefore operated in accordance with the registration i.e. the information it is desired to secure. The memory circuit M6 is reset as described above each time the subtraction is performed but when the count has been reduced to zero, there is not output over SLT2 and it remains operated and the memory circuit M7 is then operated in position 18. The operation of memory circuit M7 erases the registration on the second transfer track by connecting potential to lead AT2, holds memory circuits M5 and M6 inoperative by applying a continuous reset condition and operates memory circuit M8. This memory circuit is operated successively over one or both of the coincidence circuits M7, M9, SLT1, TX8 and M7, M10, SLT1, TX14 and thereupon subtracts one from the tens and units digits of the address registered on the first transfer track, on each occasion sending a pulse over the leads TP and UP as long as the relevant digit has not been counted out. These leads extend to the display device ND2. The subtraction operation is performed in the manner previously described by the connection of potential to lead AT1 to change 1's to 0's and the connection of potential to lead BT1 if 0's are encountered (potential on lead SLT1) to change these 0's to 1's. When a 1 is encountered, memory circuit M8 is reset in the circuit SLT1, TX(9+10 . . . 12+15 . . . 18) and the reversal process is terminated. Memory circuit M8 is also reset by TX13 between the two digit registrations and also if necessary by TX1. It will be seen from FIGURE 10 that memory circuits M9 and M10 are operated in the coincidence circuits M8, SLT1, TX12 and M8, SLT1, TX18 respectively and hence this can only take place for instance for memory circuit M9 if memory circuit M8 remains operated until the TX12 position is reached. This only occurs in two instances, namely if the registration has been reduced to zero so that the TX9–TX12 positions all contain 0's, and if the registration is 8 in which case there is a 1 in TX12. Operation of memory circuit M9 in this latter case is prevented however by the inclusion of SLT1 in the coincidence circuit. When both digits have been reduced to zero, memory circuits M9 and M10 will both be operated so that there will no longer be any circuit for re-operating memory circuit M8. The operation of both memory circuits M9 and M10 also completes a circuit over lead PR for initiating the operation of suitable printing equipment PE and when this has performed the printing operation, potential is connected to lead PC, and serves to reset memory circuits M7, M9 and M10.

If however key KB has been operated to give a step-on facility, memory circuit M5 while operated will have caused the insertion of a dot in position 1 of the next meter registration so that memory circuit M5 can be again operated and the extracting operation then proceeds for the next meter position. In this case the subscriber's number is written on the first transfer track cleared by memory circuit M8 as just described, by memory circuit M5 connecting output SLA to lead BT1. The two digits are then available for pulsing out into the equipment ND2 as before.

In order to initiate the automatic read-off operation when the capacity of any meter is approached, use is made of the fact that a dot will then be inserted in the final position 18 of the storage area and with contacts KA1 open, this effects the operation of memory circuit M5. In order to keep the timing sequence correct it is preferable to use an auxiliary reading head for the meter track which is spaced one meter position ahead of the normal reading head in the general manner described in detail in the application of G. T. Baker, Serial No. 357,472, filed May 26, 1953. The output of this reading head, it will be noted, is applied to SLS'. It is also necessary to employ an auxiliary reading head for the address track to provide the proper output on lead SLA' but in this case the head is set one meter position behind rather than in front of the regular head. In this case the address of the meter reading concerned is not identified by a dialling operation but has to be picked up by the auxiliary reading head and is written on to the first transfer track under the control of memory circuit M5. This is effected as before by the coincidence circuit involving SLA and the output of memory circuit M5.

In these circumstances it is necessary to indicate the particular track on which the registration is stored which has initiated the reading off operation and this information can readily be provided by the use of further memory circuits MT1, MT2 . . ., FIGURE 10, which are selectively operated under the control of the track clock pulses TW1, TW2 when memory circuit M5 is first operated and the second transfer track is clear. The outputs of these memory circuits appear on leads T1 and T2 extending to the number display device ND2 in the equipment CO. These memory circuits are reset by the reset pulse over lead PC when printing of the extracted meter registration has been completed.

The simple ararngement described above will give automatic read-off when the registration has in fact only reached half the full capacity and this may not be a very economical arrangement. A much closer approximation to full capacity could readily be obtained by providing a further memory circuit which is set by the presence of a 1 in a particular position but is reset if there are 0's in any of the subsequent positions. When however all these subsequent positions contain 1's, the memory circuit remains operated so as to bring about the operation of memory circuit M5 and thus initiate the automatic read-off condition. Clearly if it were thought worth while it would be possible to give this automatic read-off facility on some round number of the decimal scale, for instance with the figures considered 50000, but the advantages might not be worth the added complication.

We claim:

1. In a telephone system having arrangements for registering fees for telephone calls, a cylindrical drum having a surface of magnetic material, means for rotating said drum about its axis, a plurality of subscribers' lines, means for registering numbers representing total fees on a circumferential track on said drum in separate sections respectively corresponding to different subscribers' lines, means for identifying said different sections, a reading head arranged to co-operate with said track, control equipment for said reading head, a dial switch associated with said control equipment, a first number display device for displaying a number representing total fees, a second number display device for displaying subscribers' numbers, means in said control equipment controlled by said reading head and responsive to the dialling of a subscriber's number for operating said first display device in accordance with the registration in the section of track corresponding to said subscriber and for operating said second display device under the control of said identifying means in accordance with the number of said subscriber and further means in said control equapment automatically effective thereafter for operating said first display device in accordance with the registration in another section of track and for operating said second display device in accordance with the number of the corresponding subscriber.

2. In a telephone system having arrangements for registering fees for telephone calls, a cylindrical drum having a surface of magnetic material, means for rotating said drum about its axis, a plurality of subscribers' lines, means for registering numbers representing total fees on a first circumferential track on said drum in separate sections respectively corresponding to different subscribers' lines, a second circumferential track on said drum provided with registrations corresponding to subscribers' numbers, third and fourth circumferential tracks on said drum, reading heads for said tracks, control equipment for said reading heads, a dial switch associated with said control equipment, means responsive to the operation of said dial switch for registering a subscriber's number repeatedly round said third track, means for comparing said repeated registration on said third track with the registrations on said second track, a first number display device, means responsive to said reading heads finding correspondence between the registration on said third track with one of the registrations on said second track for operating said first display device in accordance with the number dialled, means for transferring the registration in the corresponding section of said first track to said fourth track, a second number display device, and means for operating said second display device in accordance with the registration transferred to said fourth track.

References Cited in the file of this patent

UNITED STATES PATENTS

| | | |
|---|---|---|
| 2,513,112 | Shepherd | June 27, 1950 |
| 2,680,155 | Molnar | June 1, 1954 |
| 2,700,148 | McGuigan | Jan. 18, 1955 |
| 2,764,634 | Brooks | Sept. 25, 1956 |
| 2,767,246 | Retallack | Oct. 16, 1956 |
| 2,782,256 | Malthaner | Feb. 19, 1957 |
| 2,979,569 | Kosten | Apr. 11, 1961 |